US006092731A

United States Patent [19]
Smith

[11] Patent Number: 6,092,731

[45] Date of Patent: *Jul. 25, 2000

[54] EASY OPENING MONEY WRAPPER WITH GRADUATED SCALE AND BAR CODE AND A SYSTEM AND METHOD FOR MANAGING INVENTORY OF MONEY USING SAME

[75] Inventor: Paul A. Smith, Glenview, Ill.

[73] Assignee: Eversharp Pen Company, Franklin Park, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,146

[22] Filed: Jan. 30, 1998

Related U.S. Application Data

[63] Continuation-in-part of application No. 08/937,711, Sep. 25, 1997, abandoned.

[51] Int. Cl.[7] .................................................... G06K 19/00

[52] U.S. Cl. ........................... 235/487; 453/60; 229/87.2

[58] Field of Search .................................... 235/375, 495, 235/487; 453/58, 59, 60, 31; 229/87.2

[56] References Cited

U.S. PATENT DOCUMENTS

| | | | |
|---|---|---|---|
| 4,236,559 | 12/1980 | Archbold . | |
| 4,290,523 | 9/1981 | Wallace | 206/0.82 |
| 4,505,425 | 3/1985 | Alsup | 229/87.2 |
| 4,670,643 | 6/1987 | Hain et al. | 235/379 |
| 4,992,648 | 2/1991 | Hutchison et al. | 235/379 |
| 5,099,423 | 3/1992 | Graef et al. | 364/406 |
| 5,451,757 | 9/1995 | Heath, Jr. | 235/382 |
| 5,524,945 | 6/1996 | Georgopoulos et al. | 292/307 |
| 5,607,351 | 3/1997 | Schwartz | 453/32 |
| 5,820,267 | 10/1998 | Nobles | 383/97 |

FOREIGN PATENT DOCUMENTS

| | | | |
|---|---|---|---|
| 488 | of 1912 | United Kingdom | 229/87.2 |

OTHER PUBLICATIONS

Adams, Russ, "Sourcebook of Automatic Identification and Data Collection" 1990, published by Van Nostrand Reinhold, pages 1 and 3.

Adams, Russ, "Var Code: Design for Profit", Bar Code News, vol. 5, No. 6, Nov. 1985, p. 6.

Worthington, Hal, "OCR Today", Bar Code News, Jan./Feb. 1984, pp. 32, 35, and 36.

*Primary Examiner*—Donald Hajec
*Assistant Examiner*—Mark Tremblay
*Attorney, Agent, or Firm*—Patents & TMS, P.C.

[57] ABSTRACT

A coin and currency wrapper are provided wherein the coin and currency wrappers include a graduated scale and/or a machine readable code to simplify usage of the same. In addition, a money bag or envelope is also provided having a machine readable code. Further, the wrappers may include a perforated tear line for assisting removal of the wrapper to access the money. A system and method are further provided for managing inventory of money placed into and removed from, for example, a cash register. The system and method accurately track and manage inventory of money that is typically and often times exchanged within a device.

21 Claims, 3 Drawing Sheets

*FIG. 8*
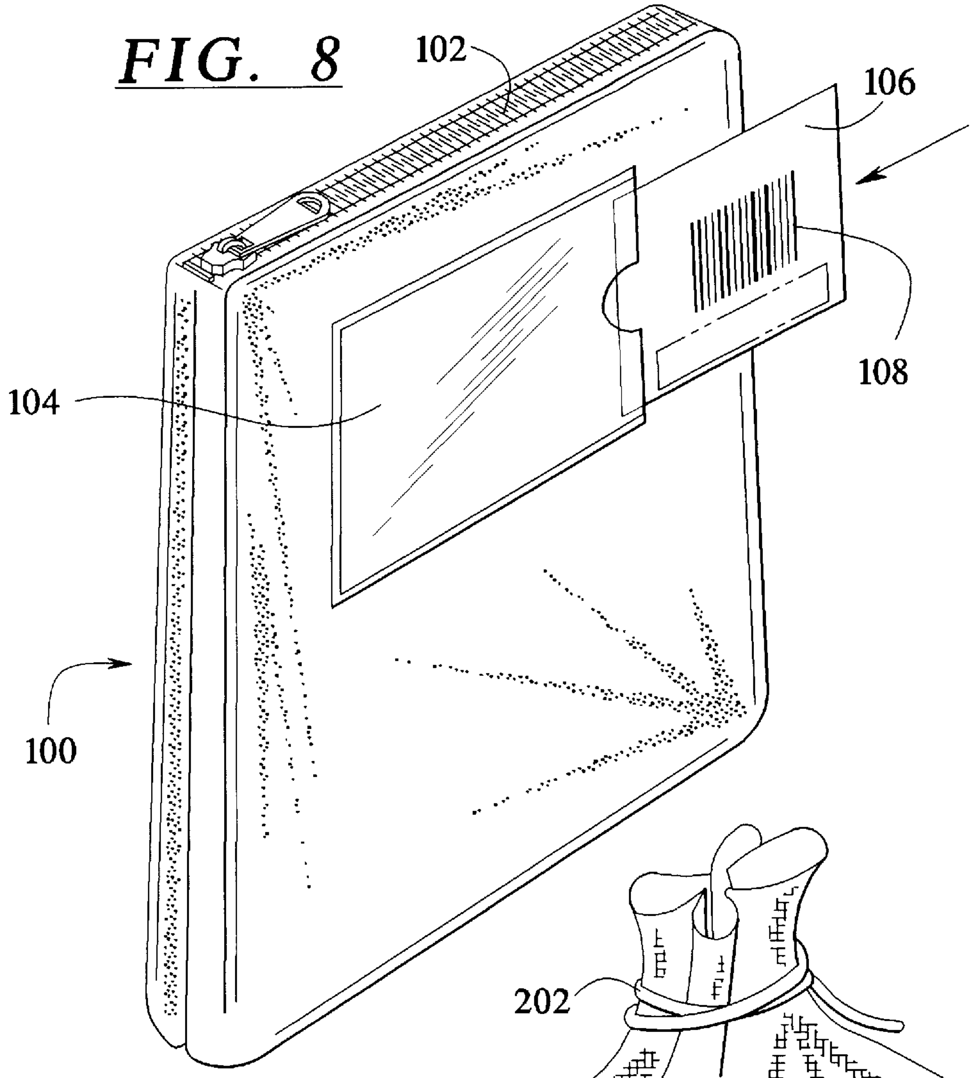
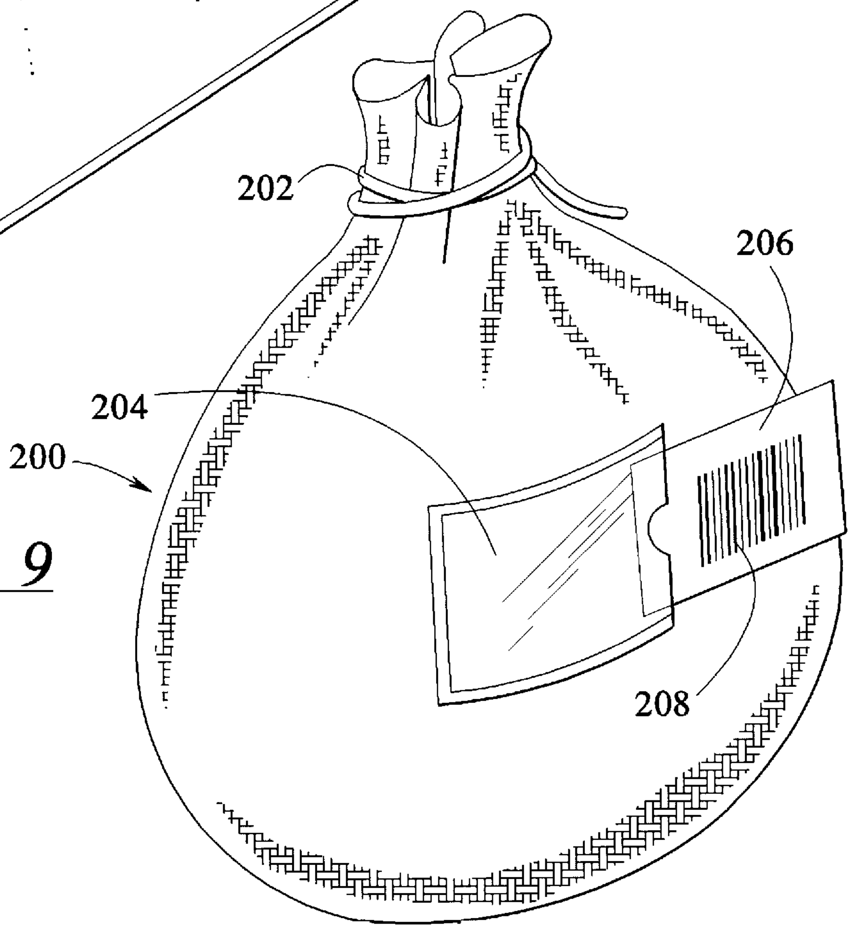
*FIG. 9*

EASY OPENING MONEY WRAPPER WITH GRADUATED SCALE AND BAR CODE AND A SYSTEM AND METHOD FOR MANAGING INVENTORY OF MONEY USING SAME

RELATED APPLICATION DATA

This application is a continuation-in-part application of U.S. patent application Ser. No. 08/937,711, filed Sep. 24, 1997, now abandoned.

BACKGROUND OF THE INVENTION

The present invention generally relates to a money wrapper or money bag as well as a system and a method for managing or tracking inventory of money using the wrapper or bag. More specifically, the present invention relates to a currency or coin wrapper or money bag incorporating a machine readable code, particularly for tracking inventory of the money entered into and removed from a system. Further, the present invention relates to a money wrapper that includes a simplified manner for opening the same.

It is, of course, generally known to provide a coin or currency wrapper to maintain predetermined amounts of coins or currency within a bundle or roll. Known coin and currency wrappers require that specific amounts of coinage or currency, respectively, be placed in a wrapper in order to maintain the integrity of the amounts held by the wrapper. Therefore, to use smaller amounts of coins or currency rather than a complete roll or bundle often creates an unnecessary or unwanted amount of cash or currency within a particular given system.

Moreover, particularly with coins wrapped in rolls, it is often difficult to remove the coin from the roll and yet maintain the integrity of the roll. As commonly seen in the retail and restaurant industry, the entire roll if often slammed, for example, against a counter in order to break the roll to remove the coins therefrom. This current process can be dangerous and often coins can be lost in the process.

Still further, it is, of course, known to use wrapped coins or currency within many industries, including, but not limited to, banking, gambling, retail, food service, hotels and the like. However, when a coin and/or currency is brought into a system for use within a device, such as a cash register or the like, currently no automatic tracking system exists to inventory the amount of cash entered into or removed from the device. Rather, manual tracking is employed by entering information related to the amounts of coins and/or currency brought into or removed from the particular device used within the particular industry.

A need, therefore, exists for an improved coin wrapper, currency wrapper, and a system and method for managing inventory of monies entered into or removed from a system.

SUMMARY OF THE INVENTION

The present invention provides a money wrapper, coin wrapper, currency wrapper or money bag and a system and a method for managing inventory of money entered into or removed from a device used within a particular industry using the wrapper or bag of the present invention.

In an embodiment of the present invention, a money wrapper is provided. The money wrapper has a sheet having a first and a second and defining a length therebetween wherein the sheet is imprinted with information related to money. A machine readable code is provided on the sheet wherein the code is associated with the money. A money wrapper is provided. The money wrapper comprises a sheet having a first end and a second end defining a length therebetween wherein the sheet is imprinted with information related to money. A machine readable code is provided on the sheet wherein the code is associated with the money.

In an embodiment, a tear line is provided in the sheet.

In an embodiment, the tear line extends along the length of the sheet.

In an embodiment, the tear line extends along a width of the sheet wherein the width is defined perpendicular to the length.

In an embodiment, a plurality of tear lines is provided in the sheet.

In an embodiment, designators printed on the sheet are indicative of variable amounts of money.

In another embodiment of the present invention, a coin wrapper has a sheet having a first end and a second end defining a length therebetween and a first side and a second side defining a width therebetween wherein the sheet is imprinted with information related to coins. A tear line extends through the sheet.

In an embodiment, the tear line extends across the length of the sheet.

In an embodiment, a tab extends from the sheet at an end of the tear line.

In an embodiment, a tab extends from the sheet at an end of the tear line.

In an embodiment, a second tear line extends the length of the sheet parallel to the first tear line.

In an embodiment, a machine readable code is provided on the sheet wherein the code is associated with the coins.

In another embodiment of the present invention, a currency wrapper is provided with a first end and a second end defining a length therebetween wherein the sheet is imprinted with information related to currency. Designators are printed on the sheet indicative of variable amounts of currency.

In an embodiment, designators are printed in the form of a graph divided into variable portions of a maximum amount of currency.

In an embodiment, a machine readable code is provided on the sheet wherein the code is associated with the currency.

In another embodiment of the present invention, a system for managing inventory of money entered into or removed from a device is provided. The system has a plurality of money holders each holding various amounts of money including currency or coins wherein the plurality of money holders are provided with a machine readable code indicative of information related to the money in the money holder. A scanner is further provided capable of reading the machine readable code and generating a signal related thereto. A processor receives the signal from the scanner wherein the processor tracks the money and provides an inventory of the money entered into or removed from the device.

In an embodiment, the machine readable code is a bar code.

In an embodiment, an output means receives information from the processor to generate a report with respect to the information.

In an embodiment, a method for managing inventory of money entered into or removed from a device is provided. The method comprises the steps of: providing money in a holder wherein the holder is provided with a machine readable code indicative of information related to the money in the holder; scanning the machine readable code and generating a signal related thereto; and processing the scanned signal to track the money entering into or removed from the device.

In an embodiment, the money is coins or currency.

In an embodiment, outputting the processed data provides a report with respect to the inventory.

In another embodiment of the present invention, a holder is provided. The holder has exterior walls defining an interior space capable of receiving currency and/or coins in the interior space. A machine readable code is provided on the exterior walls indicative of the currency and/or coins in the interior space.

In an embodiment, a sleeve is attached to the exterior wall.

In an embodiment, a fastener is associated with the exterior wall to provide access to the interior space.

It is, therefore, an advantage of the present invention to provide a money wrapper, coin wrapper, currency wrapper or money bag and a system and method for managing inventory of money that simplifies the management of money entered into and removed from a device.

Another advantage the present invention is to provide a money wrapper, coin wrapper, currency wrapper or money bag and a system and method for managing inventory of money that simplifies removal of money from the wrapper or bag for use within the system.

Yet another advantage of the present invention is to provide a money wrapper, coin wrapper, currency wrapper or money bag and a system and method for managing inventory of money that includes a machine readable code on the wrapper or bag to assist in tracking of money entered into a device.

Moreover, an advantage of the present invention is to provide a money wrapper, coin wrapper, currency wrapper or money bag and a system and method for managing inventory of money that allows removal of portions of money from the wrapper or bag for use within the system and method.

Additional features and advantages of the present invention are described in, and will be apparent from, the detailed description of the presently preferred embodiments and from the drawings.

BRIEF DESCRIPTION OF THE DRAWINGS

FIG. 8 illustrates a perspective view of an embodiment of a money bag or envelope with an incorporated bar code label.

FIG. 9 illustrates a perspective view of another embodiment of a money bag with an incorporated bar code label.

DETAILED DESCRIPTION OF THE PRESENTLY PREFERRED EMBODIMENTS

The present invention provides a coin wrapper, a currency wrapper or money bag and a system and method for managing inventory of money. More specifically, the present invention relates to an easy opening coin wrapper with a machine readable code imprinted thereon and a graduated scale further imprinted thereon. Likewise, the currency wrapper or money bag may include a machine readable code and/or a graduated scale imprinted thereon. The coin and currency wrappers or money bag may be implemented into a system and method for tracking inventory that scans the machine readable codes on the wrappers or bags and may track the inventory of coins and/or currency entered into or removed from a device used within a specific industry.

Although the present invention will be described with reference to coins or currency, it should be understood that items such as tokens, slugs, chips or the like may also be used in place of coins and coins is not to be construed as limited to money per se. Furthermore, it should be understood that coins and currency may be United States or foreign currency, and the invention should not be limited in that regard. Further, printing of information on the coin or currency wrapper or money bag may be in English and/or any desired language, particularly the language of origin of the coins or currency.

Figure 1:
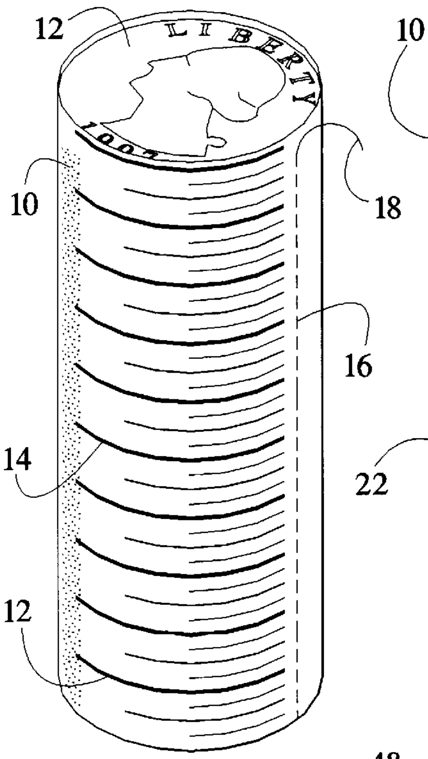
FIG. 1 illustrates a perspective view of a roll of coins wrapped in an embodiment of a wrapper of the present invention.

Referring now to the drawings wherein like numerals refer to like parts, FIG. 1 generally illustrates an embodiment of a coin wrapper 10 holding a roll of coins 12, in this case, in the illustrated embodiment, United States quarters. The wrapper 10 is provided with a scale 12 such that an individual can clearly identify the amount of coins included in, for example, a partial roll. The graduated scale 14 is divided into ten distinct sections by the boldest and longest lines illustrated in FIG. 1. Therefore, in a roll including ten dollars of quarters, each of the solid long lines are indicative of one dollar.

As further illustrated in FIG. 1, a tear line 16 may be provided having a tab 18 operatively connected to an end of the tear line 16 to initiate opening of the wrapper 10 at the tear line 16. To this end, the tab 18 is pulled until the tear line 16 begins separating the wrapper 10. The wrapper 10 may be opened completely along the tear line 16 to remove all of the coins 12 therein. Alternatively, the tearing along the tear line 16 may be partially performed such that a specific amount of the coins 12 may be removed from the wrapper 10. The amount of the coins 12 remaining in the wrapper 10 may be identified by counting along the graduated scale 14. Alternatively, numerical designations may be placed along the graduated scale 14 to indicate partial amounts of the total included within the wrapper 10.

Figure 2:
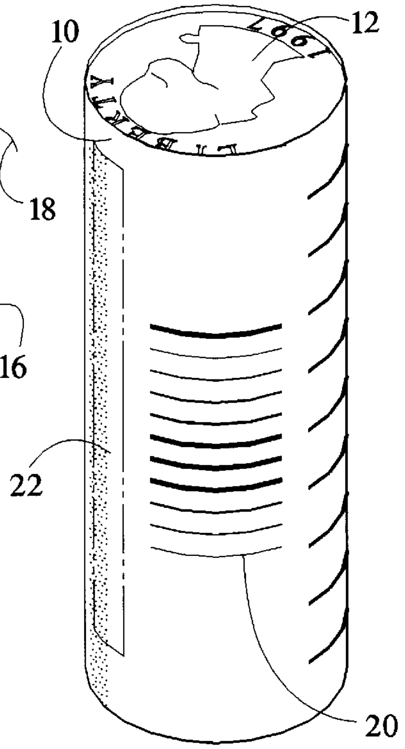
FIG. 2 illustrates a perspective view of a roll of coins in an embodiment of a wrapper of the present invention with a machine readable code imprinted thereon.

Referring to FIG. 2, the embodiment of the wrapper 10 shown in FIG. 1 including the coins 12 therein is shown. The wrapper 10 includes a machine readable code 20 printed thereon. The machine readable code 20 may be read by appropriate scanning devices as will be described hereinafter with reference to FIG. 7. As further shown in FIG. 2, information may be generally printed on the wrapper 10 as generally designated by the box 22 shown in phantom in FIG. 2. The block 22 may include information relating to the type of currency, the amount of currency, instructions for use, or the like. Of course, any appropriate place for containing such information may be incorporated and is not limited to the position of the box 22 shown in FIG. 2.

Figure 3:
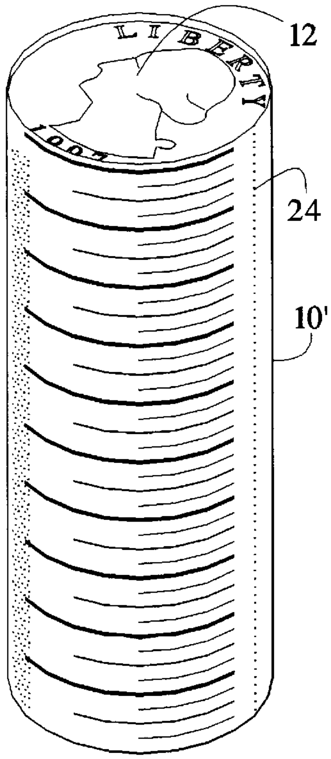
FIG. 3 illustrates a perspective view of a roll of coins in an embodiment of a wrapper of the present invention.

Referring now to FIG. 3, another embodiment of a wrapper 10' is generally illustrated for holding the coins 12 therein. The wrapper 10' includes a perforated tear line 24 extending along a length of the roll or a width of the wrapper 10'. The perforated tear line 24 assists in opening the wrapper 10' and removing the coins 12 therein.

Figure 6:
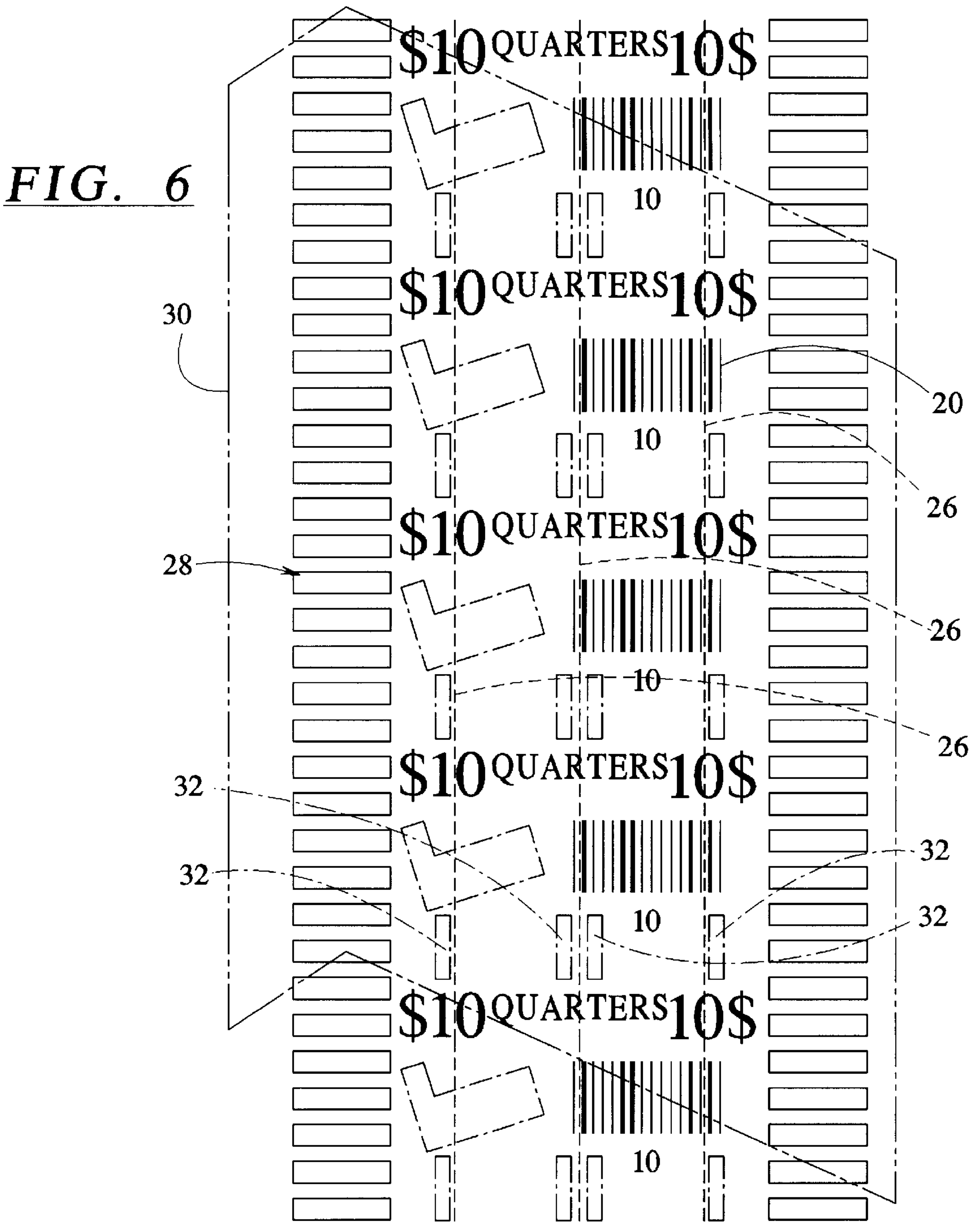
FIG. 6 illustrates a plan view of an embodiment of a coin wrapper of the present invention.

Referring to FIG. 6, a flat version of the coin wrapper is generally illustrated with a modified perforated tear line. The lines shown in phantom are lines at which the continuous sheet may be is cut to implement the same for rolling around the coins as illustrated in FIGS. 1–3. As shown in FIG. 6, a slightly modified embodiment is provided with perforations 26 extending along a length of a sheet 28 which, when cut, forms a flat 30 used to create the wrapper 10. The perforation 26, as illustrated, are equally distantly separated along the length of the sheet or width of the roll such that specific amounts of coin may be removed at the specific perforation. Boxes 32 are provided at the perforations 26 to indicate the amounts that each of the perforations 26 represents along the width of the roll. Therefore, with three perforations, as illustrated in FIG. 6, for a roll of ten dollars worth of quarters, four separate sections are formed wherein removal of any one section represents removal of two dollars and fifty cents from the roll. Of course, the perforated tear lines 26 may be constructed at any degree of graduation along the width of the sheet, and equal divisions are not necessarily required.

Further, the sheet 28 in FIG. 6 clearly shows a machine readable code 20 imprinted thereon. Of course, it should be further understood that many types of machine readable codes including, but not limited to, bar codes and optical character recognition (OCR) codes may be imprinted on the sheet 28.

Figure 4:
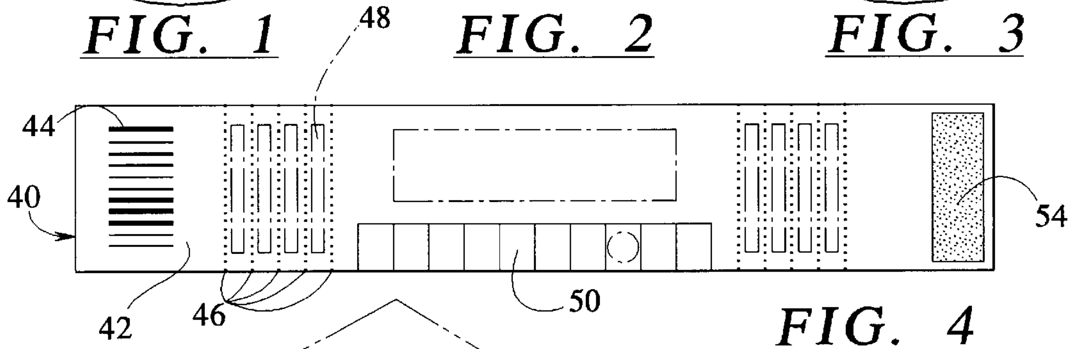
FIG. 4 illustrates a plan view of an embodiment of a currency wrapper of the present invention.
Figure 5:
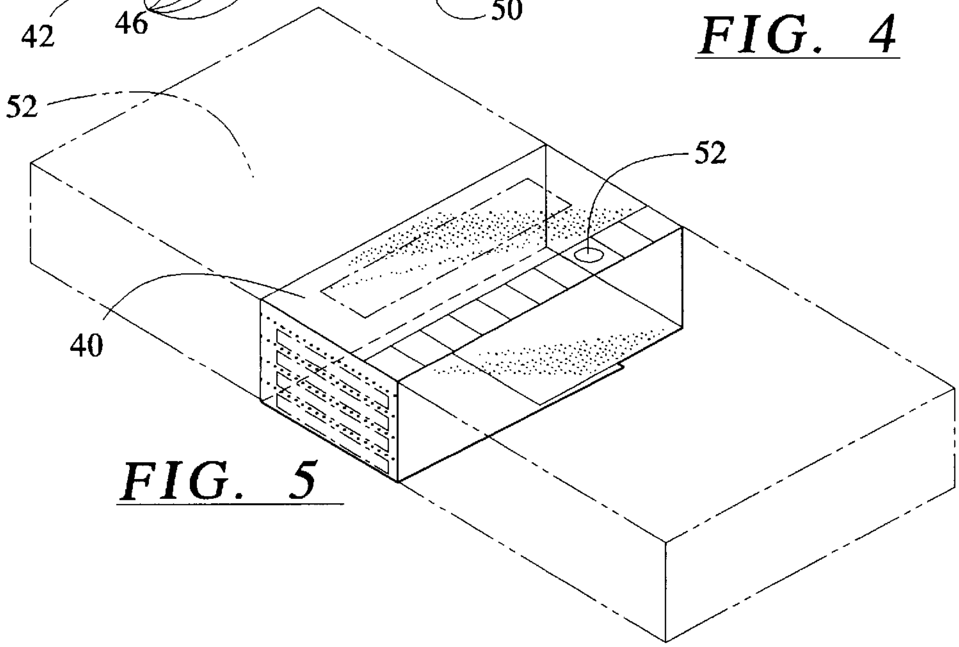
FIG. 5 illustrates a prospective view partially in phantom of a currency wrapper incorporated around a stack of currency.

Referring now to FIGS. 4 and 5, a currency wrapper 40 is generally illustrated formed from a sheet 42 including pre-printed information thereon. The sheet 42 includes a machine readable code 44 providing information regarding the type or amount of currency withing the wrapper 40. Division lines 46 may be provided along a width of the wrapper 40. The division lines 46 may be in the form of perforated tear lines such that specific segments of currency may be removed from the wrapper without removing the entire amount therefrom. Information regarding the amount that each segment represents or the like may be incorporated in, for example, a box 48 as illustrated in FIG. 4.

If less than a total generally accepted amount of currency for this particular style of the wrapper 40 is banded together, a graduated scale 50 is provided along a length of the wrapper 40. As shown, the scale 50 includes ten boxes. Each box of the scale 50 may be representative of a portion of the total that is possible to be wrapped. The boxes may be punched with a hole to indicate the amount of currency that is included in the wrapper 40. Alternatively, each box may include a perforated punch out section that allows a portion of the box to be removed from the scale 50. Or, in another embodiment, a mark may simply be placed in the box by, for example, a pen or other marking device, such that once the currency is wrapped, the specific amount included in the wrapper 40 may be designated in the scale 50.

FIG. 5 generally illustrates use of the currency wrapper 40 around a bundle of currency 52. As shown, a punched hole 54 is made in the eighth box out of the ten boxes. This represents that eighty percent of a complete bundle is provided in the stack of currency. Of course, this particular mark may also designate other amounts depending on the particular application for which the currency wrapper is implemented. As shown in FIG. 4, an adhesive section 54 is provided such that when the wrapper 40 is folded around the currency 52 as illustrated in FIG. 5, a back side of the currency wrapper 40 may be secured at the adhesive 54 to a front side of the wrapper 40 to securely hold the currency 52 within the wrapper 40.

Referring now to FIGS. 8 and 9, a money envelope 100 is generally shown in FIG. 8, and a money bag 200 is generally shown in FIG. 9. The money envelope 100 or the money bag 200 are capable of carrying money, including coins and/or currency, as well as checks or the like within their respective interiors. The money envelope 100 and the money bag 200 are commonly used and available in, for example, the restaurant industry, tollway collection systems, the banking industry and the like. Of course, other types of money holders may be implemented by one of ordinary skill in the art, and the present invention should not be construed as limited to the specific embodiments illustrated in the figures.

As shown in FIG. 8, the money envelope 100 includes a fastener 102 which, when opened, provides access to an interior of the envelope 100. The money envelope 100 or the money bag 200 are capable of holding currency, coins, checks or the like within their respective interiors or the sleeve 104 in which a label 106 may be inserted. The sleeve 104 is preferably transparent or translucent such that information on the label 106 may be visible when inserted therein. In a preferred embodiment, the label 106 includes a machine readable code, such as a bar code 108. The bar code 108 provides information indicative of the contents in the interior of the envelope 102. This may be used for tracking and inventory purposes which will be described hereinafter with reference to FIG. 7.

Like FIG. 8, FIG. 9 shows the money bag 200 including a sleeve 204 capable of receiving a label 206 having a machine readable code 208 thereon. The purpose and function of the money bag 200 are identical to the money envelope 100 described in FIG. 8. In addition, the money bag 200 may include a tie fastener 202 to enclose an opening into the interior of the money bag 200.

Although the money envelope 100 and the money bag 200, as illustrated, show a sleeve that is attached to the envelope 100 or the bag 200 in which the label is inserted, it should be understood that the envelope 100 or the bag 200 may be pre-printed with a machine readable code, or a label may be directly attached to the envelope 100 of the bag 200. Of course, the envelope 100 and the bag 200 may be constructed from various materials and may also be various shapes and sizes depending on the particular application in which the same is implemented.

Figure 7:
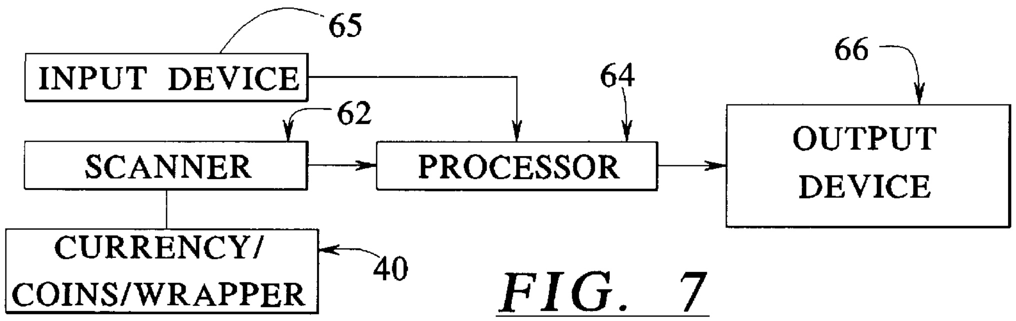
FIG. 7 illustrates a black box diagram of an embodiment of a system for managing inventory of money particularly with use of the coin and currency wrappers of the present invention.

Referring now to FIG. 7, an embodiment of a system 60 is illustrated for implementing the particular process for tracking inventory of currency or coins as entered into or removed from a system in which the same is employed, such as, for example, a cash register, a gaming or gambling device, retail or restaurant operation or the like. To this end, a scanner 62 is provided. The scanner 62 scans a machine readable code located on a wrapper or money bag, for example, holding either currency or coins as previously described with reference to FIGS. 1–6, 8 and 9. The scanner 62 downloads that information to a processor 64 such that the amount of money entered into or removed from a device, such as a cash register, may be managed and accurately tracked. Other information or data may also be entered into the processor 64 by an input device 65, such as a keyboard or the like.

The processor 64 may be loaded with suitable, specifically designed and customized programs to manage the inventory of cash or currency entered into or removed from a system. For example, the processor 64 may include programs to update inventory of cash or currency using the scanner 62. The program may also implement a reverse counting feature that monitors the depletion of inventory. In addition, file management of cash or currency inventory may be achieved as well as providing a listing of cash or currency inventory transactions, providing a report of cash or currency replenishment and/or providing a report on cash or currency usage.

As a result, information regarding the inventory of cash or currency placed into or removed from a device or system may be accurately tracked. Further, this information may be downloaded from the processor 64 to an output device 66. The output device 66 may be, for example, a display screen and/or printer, for example.

While the present invention has been described with reference to a variety of money holders, specifically coin wrappers, currency wrappers, money bags and money envelopes, it should be appreciated that the tracking and inventory of any type of money holder is envisioned by the present invention. Therefore, the invention should not be construed as limited to the illustrated embodiments.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A money wrapper comprising:

a sheet having a first end and a second end defining a length therebetween wherein the sheet is imprinted with information related to money;

a code on the sheet wherein the code is electronically read and further wherein the code uniquely identifies the money wrapper for tracking of the money wrapper; and a scale on the sheet wherein the scale is divided into increments representing graduated amounts of money.

2. The wrapper of claim 1 further comprising:

a tear line in the sheet.

3. The wrapper of claim 2 wherein the tear line extends along the length of the sheet.

4. The wrapper of claim 2 wherein the tear line extends along a width of the sheet wherein the width is defined perpendicular to the length.

5. The wrapper of claim 1 further comprising:

a plurality of tear lines in the sheet.

6. The wrapper of claim 1 further comprising:

designators printed on the sheet indicative of variable amounts of money.

7. A coin wrapper comprising:

a sheet having a first end and a second end defining a length therebetween and a first side and a second side defining a width therebetween wherein the sheet is imprinted with information related to coins;

a tear line extending through the sheet;

a scale on the sheet wherein the scale is divided into increments representing graduated amounts of money; and a code on the sheet wherein the code is electronically read and further wherein the code uniquely identifies the coin wrapper for tracking of the coin wrapper.

8. The wrapper of claim 7 wherein the tear line extends across the length of the sheet.

9. The wrapper of claim 7 further comprising:

a tab extending from the sheet at an end of the tear line.

10. The wrapper of claim 7 further comprising:

a tab extending from the sheet at an end of the tear line.

11. The wrapper of claim 7 further comprising:

a second tear line extending across the length of the sheet parallel to the first tear line.

12. The wrapper of claim 7 further comprising:

a machine readable code on the sheet wherein the code is associated with the coins.

13. A currency wrapper comprising:

a sheet having a first end and a second end defining a length therebetween wherein the sheet is imprinted with information related to currency;

a scale on the sheet wherein the scale is divided into increments representing graduated amounts of money; and a code on the sheet wherein the code is electronically read and further wherein the code uniquely identifies the currency wrapper for tracking of the currency wrapper.

14. The wrapper of claim 13 wherein the designators are printed in the form of a graph divided into variable portions of a maximum amount of currency.

15. The wrapper of claim 13 further comprising:

a machine readable code on the sheet wherein the code is associated with the currency.

16. A system for managing inventory of money entered into or removed from a device, the system comprising:

a plurality of money holders each holding various amounts of money including currency or coins wherein each of the plurality of money holders is provided with a code wherein the code is electronically read and further wherein the code uniquely identifies an individual money holder for tracking of the money holder;

a scanner capable of reading the machine readable code and generating a signal related thereto;

a processor receiving the signal from the scanner wherein the processor tracks the money and provides an inventory of the money as the money holder is entered into and is removed from the device; and a scale on the money holder wherein the scale is divided into increments representing graduated amounts of money.

17. The system of claim 16 wherein the machine readable code is a bar code.

18. The system of claim 16 further comprising:

an output means receiving information from the processor to generate a report with respect to the information.

19. A method for managing inventory of money entered into or removed from a device, the method comprising the steps of:

providing money in a money holder wherein the money holder is provided with a code wherein the code is electronically read and further wherein the code uniquely identifies the money holder for tracking of the money holder;

scanning the machine readable code and generating a signal related thereto;

processing the scanned signal to track the money as the money holder enters into and is removed from the device;

providing a scale on the money holder wherein the scale is divided into increments representing graduated amounts of money; and punching a hole into the scale wherein the hole along the scale represents the amount of money within the money wrapper.

20. The method of claim 19 wherein the money is coins or currency.

21. The method of claim 19 further comprising the step of:

outputting the processed data to provide a report with respect to the inventory.

* * * * *